(12) United States Patent
Nagaraj

(10) Patent No.: US 9,794,740 B2
(45) Date of Patent: *Oct. 17, 2017

(54) WI-FI PROCESS

(71) Applicant: Apple Inc., Cupertino, CA (US)

(72) Inventor: Suresh Nagaraj, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/159,306

(22) Filed: May 19, 2016

(65) Prior Publication Data

US 2016/0269858 A1     Sep. 15, 2016

Related U.S. Application Data

(63) Continuation of application No. 14/449,972, filed on Aug. 1, 2014, now Pat. No. 9,357,478, which is a
(Continued)

(51) Int. Cl.
*H04W 64/00* (2009.01)
*H04W 4/02* (2009.01)
(Continued)

(52) U.S. Cl.
CPC ............ *H04W 4/02* (2013.01); *H04B 1/3805* (2013.01); *H04W 48/16* (2013.01);
(Continued)

(58) Field of Classification Search
CPC   H04B 1/3805; H04W 52/0229; H04W 84/12; H04W 8/183; H04W 48/18; H04W 8/12; H04W 64/00; H04L 29/08657
(Continued)

(56) References Cited

U.S. PATENT DOCUMENTS 5,600,706 A     2/1997   Dunn et al.
6,115,580 A     9/2000   Chuprun et al.
(Continued)

FOREIGN PATENT DOCUMENTS

EP          1962454        8/2008
JP     2006-246121 A      9/2006
(Continued)

OTHER PUBLICATIONS

Zorzi et al., "Opportunistic Localization Scheme Based on Linear Matrix Inequality, Localization in Smart Environments Special Session," hal-00383088, version 2, May 27, 2009.
(Continued)

*Primary Examiner* — Phuoc H Doan
(74) *Attorney, Agent, or Firm* — Sterne, Kessler, Goldstein & Fox, PLLC

(57) ABSTRACT

A method and apparatus for a wireless device that can adapt a rate of related wireless network unit scans for adjacent networks is disclosed. In one embodiment, the wireless device can include a wireless network unit and a co-located geo-location signal receiver, and a processor. The processor can determine the position and speed of the wireless device from data received from the geo-location signal receiver. The processor can configure the wireless network unit to adapt the rate of related wireless network scans based upon determined speed and position. In one embodiment, the wireless network unit scans can be wireless scans for other nearby networks for roaming or location based services.

20 Claims, 14 Drawing Sheets

Related U.S. Application Data continuation of application No. 13/396,226, filed on Feb. 14, 2012, now Pat. No. 8,805,360.

(51) Int. Cl.

| | | |
|---|---|---|
| *H04B 1/3805* | (2015.01) | |
| *H04W 52/02* | (2009.01) | |
| *H04W 48/16* | (2009.01) | |
| *H04W 84/12* | (2009.01) | |
| *H04W 88/08* | (2009.01) | |

(52) U.S. Cl.
CPC ... *H04W 52/0229* (2013.01); *H04W 52/0254* (2013.01); *H04W 64/00* (2013.01); *H04W 84/12* (2013.01); *H04W 52/0245* (2013.01); *H04W 88/08* (2013.01); *Y02B 60/50* (2013.01)

(58) Field of Classification Search
USPC .............. 455/432.1, 456.1, 434, 114.3, 67.7; 370/252; 702/94
See application file for complete search history.

(56) References Cited

U.S. PATENT DOCUMENTS

| | | | |
|---|---|---|---|
| 7,551,579 | B2 | 6/2009 | Alizadeh-Shabdiz et al. |
| 8,805,360 | B2 | 8/2014 | Nagaraj |
| 2004/0259546 | A1* | 12/2004 | Balachandran ....... H04W 84/12 455/435.2 |
| 2008/0117862 | A1 | 5/2008 | Yeshayahu et al. |
| 2009/0068970 | A1 | 3/2009 | Ahmed et al. |
| 2009/0103503 | A1 | 4/2009 | Chhabra |
| 2009/0131081 | A1 | 5/2009 | Abdel-Kader et al. |
| 2009/0175189 | A1* | 7/2009 | Alizadeh-Shabdiz H04W 64/006 370/252 |
| 2010/0103844 | A1 | 4/2010 | Kim |
| 2011/0171909 | A1 | 7/2011 | Jung et al. |
| 2013/0076523 | A1* | 3/2013 | Kwan .................. A61B 5/0022 340/686.6 |
| 2014/0342733 | A1 | 11/2014 | Nagaraj |

FOREIGN PATENT DOCUMENTS

| | | |
|---|---|---|
| JP | 2008-022309 A | 1/2008 |
| JP | 2008-147778 A | 6/2008 |
| JP | 2011-139345 A | 7/2011 |
| WO | WO 2010/138601 A2 | 2/2010 |

OTHER PUBLICATIONS

Sewook Jung et al., "BlueTorrent: Cooperative Content Sharing for Bluetooth Users," University of California, Los Angeles, CA, USA, Manuscript No. PMC-D-07-00017R1, Jun. 13, 2007.

English-Language machine translation for Japanese Patent Publication No. JP 2008-022309 A, published Jan. 31, 2008; 10 pages.

English-Language machine translation for Japanese Patent Publication No. JP 2008-147778 A, published Jun. 26, 2009; 9 pages.

English-Language Abstract for Japanese Patent Publication No. JP 2011-139345 A, published Jul. 14, 2011; 2 pages.

International Search Report for International Application No. PCT/US2013/025423, European Patent Office, Netherlands, mailed on Aug. 14, 2013; 7 pages.

International Preliminary Report on Patentability with Written Opinion of International Application No. PCT/US2013/025423, European Patent Office, Netherlands, dated Aug. 19, 2014; 11 pages.

English-Language Abstract for Japanese Patent Publication No. JP 2006-246121 A, published Sep. 14, 2006; 1 page.

* cited by examiner

WI-FI PROCESS

RELATED APPLICATIONS

The instant application is a continuation of and hereby claims priority to pending U.S. application Ser. No. 14/449,972, titled "Wi-Fi Process," filed Aug. 1, 2014, now U.S. Pat. No. 9,357,478, which is a continuation of U.S. application Ser. No. 13/396,226, titled "Wi-Fi Process," filed on Feb. 14, 2012, now U.S. Pat. No. 8,805,360, all of which are incorporated by reference herein in their entireties.

BACKGROUND

Field of the Described Embodiments

The described embodiments relate generally to saving power in wireless devices. In particular, methods to adapt wireless network scans are described.

Related Art

Wireless devices have increased in complexity and capability since they have become first established. Early wireless devices were only able to handle voice communication though a cell phone network. Wireless device designs now include circuitry to enable access to alternative data networks such as networks governed by one of the many versions of the IEEE 802.11 specification. The wireless device user now can access internet data through either the cell phone network or the alternative data network. Data access through the alternative data network may be less costly compared to the cell phone network. Also, depending on cellular signal quality metrics at the users' location, data throughput may be enhanced on the alternative network.

IEEE 802.11 networks are often serviced by access points (APs). A typical AP may only cover a range of roughly 2,000 square feet. When more coverage is required, multiple APs can be deployed. A wireless device currently connected to an AP can continually scan for other wireless channels so that as the user moves about, the wireless device can establish a connection to other APs if and when the current connection degrades. Such continual scans, however, can be a drain on the battery of the wireless device.

While simply increasing the period between scans can save power, the less frequent scans can make the wireless device less responsive and degrade the user experience.

Therefore, what is desired is a way to adapt the scanning rates for wireless networks to reduce power consumption and enhance the user experience.

SUMMARY OF THE DESCRIBED EMBODIMENTS

This paper describes various embodiments that relate to a wireless device, in particular methods and apparatus to adapt scanning periods of the wireless device.

In one embodiment, a method for adapting scanning periods of a wireless device can include the steps of receiving location signals with a location signal receiver, determining a change in position of the wireless device and altering a period of time between network scans in accordance with the change of position of the wireless device. In one embodiment, the location receiver can be a geo-location receiver that can be co-located with the wireless device. The network scanning periods can be adapted when the change of position indicates a displacement is greater than or less than a predetermined distance. In one embodiment, the network scans can be roaming scans that can identify other wireless networks that may be available for use and location scans that can be used to provide location based services.

A wireless device than can adapt network scanning periods is described. The wireless device can include a wireless network unit for transferring data, a co-located geo-location signal receiver unit for receiving geo-location signals and determining the position of the wireless device and a processor configured to adapt network scanning periods when the position of the wireless device changes.

A method for saving power in a mobile wireless device can include the steps of receiving a location signal at the wireless device, determining a change of position of the mobile wireless device from the location signals, determining a speed of the mobile wireless device when a change of position is detected and adapting the scanning periods based upon the determined speed. In one embodiment, the scanning periods can be adapted when the determined speed is greater than a first predetermined speed.

Other aspects and advantages of this disclosure will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the, following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
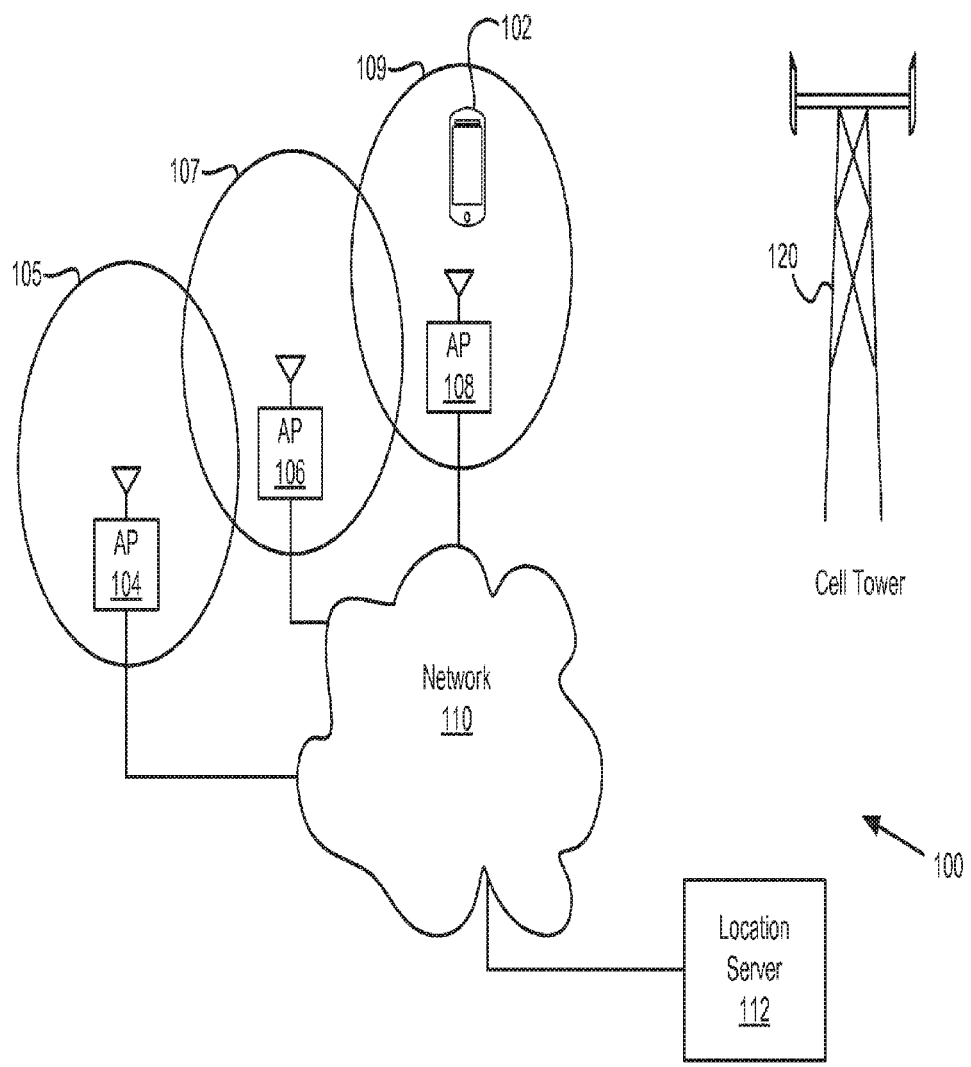

FIG. 1 is a diagram showing one example of a wireless system.

Figure 2:
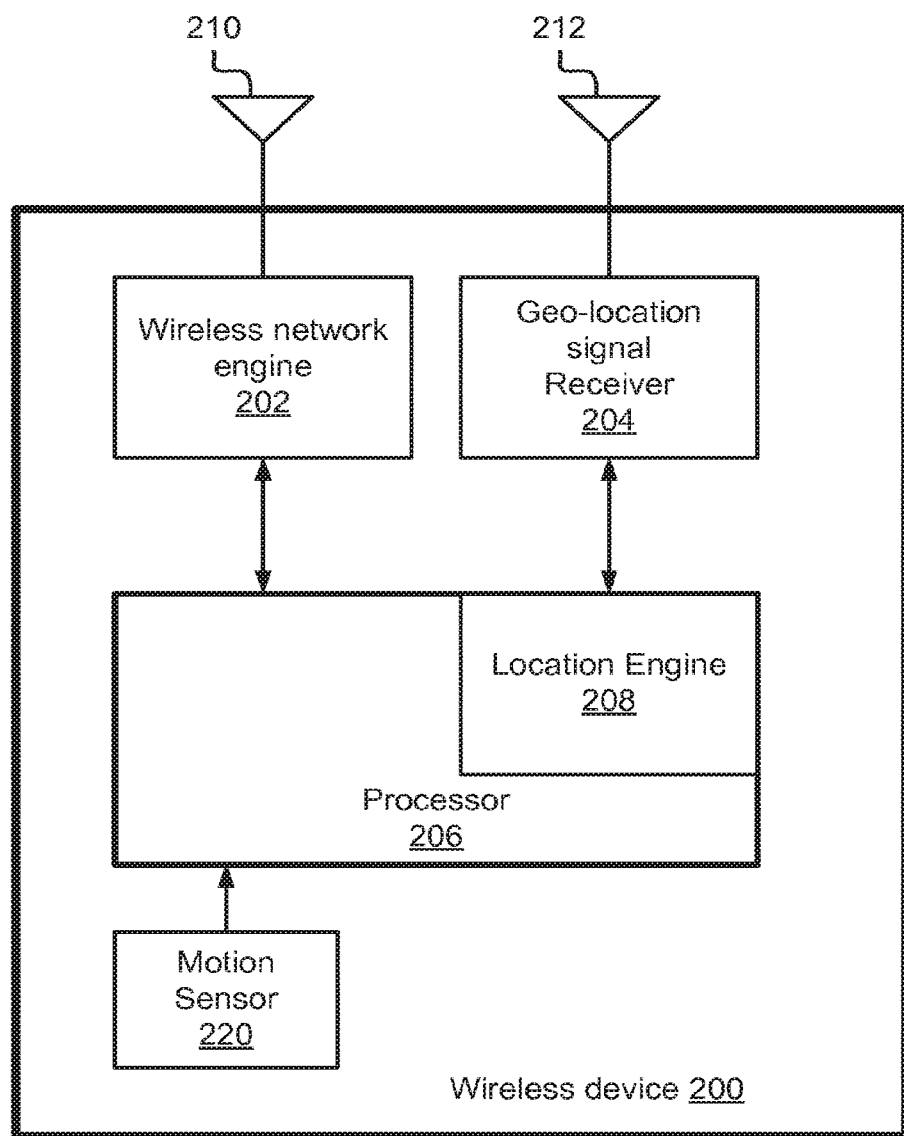

FIG. 2 is a block diagram of one embodiment of a wireless device in accordance with the specification.

Figure 3:
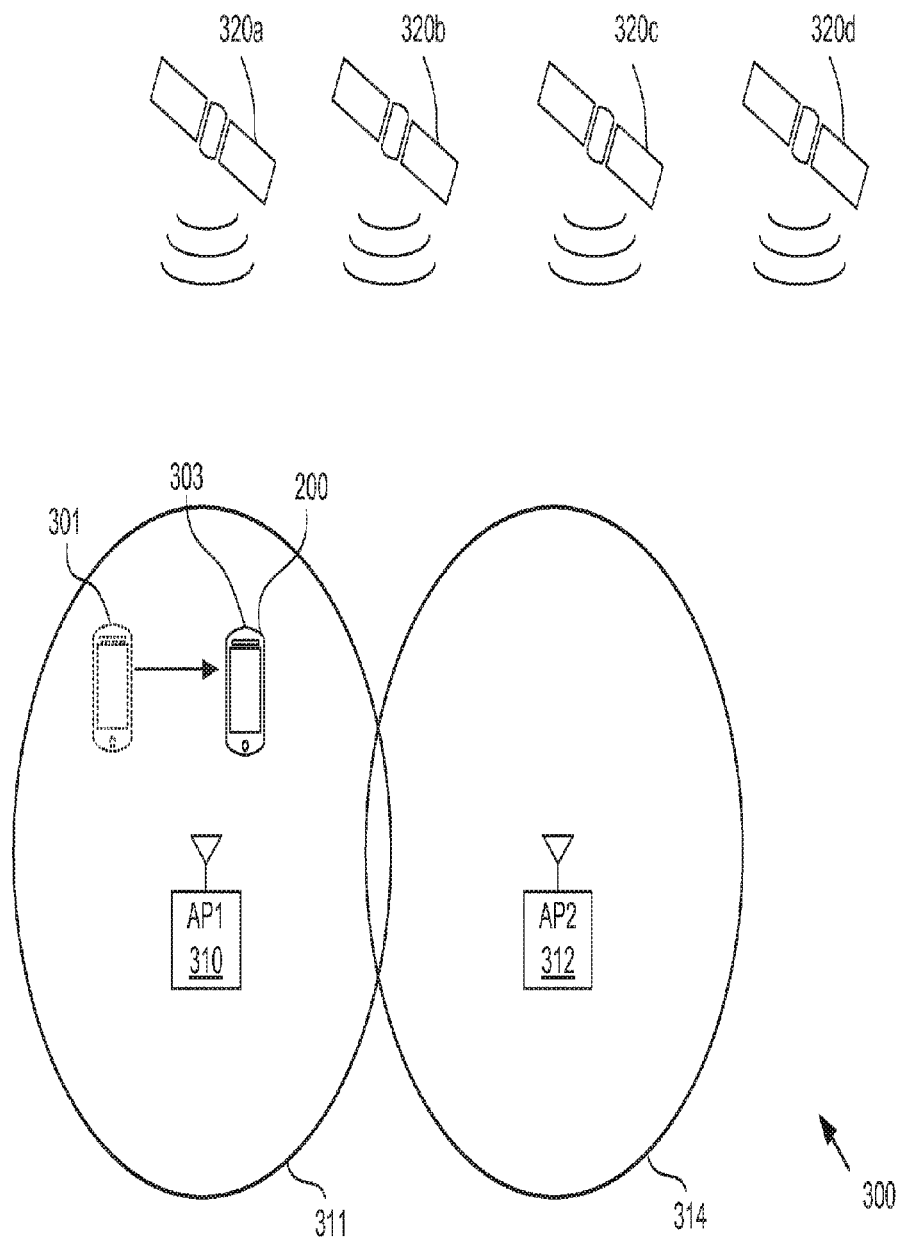

FIG. 3 is a diagram showing one embodiment of an adaptive scanning wireless system.

Figure 4:
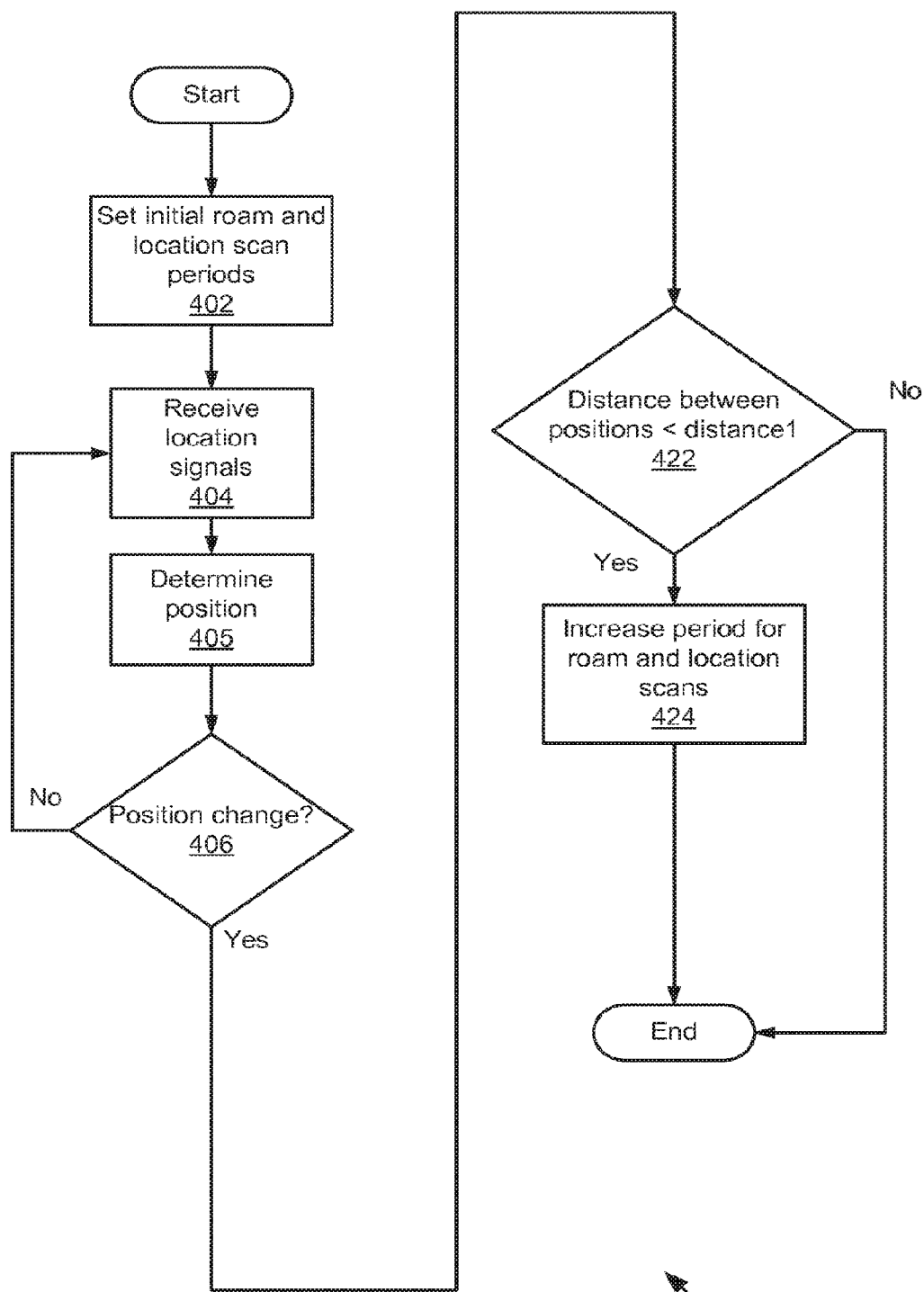

FIG. 4 is a flowchart of method steps for adapting network scanning rates, according to one embodiment of the specification.

Figure 5:
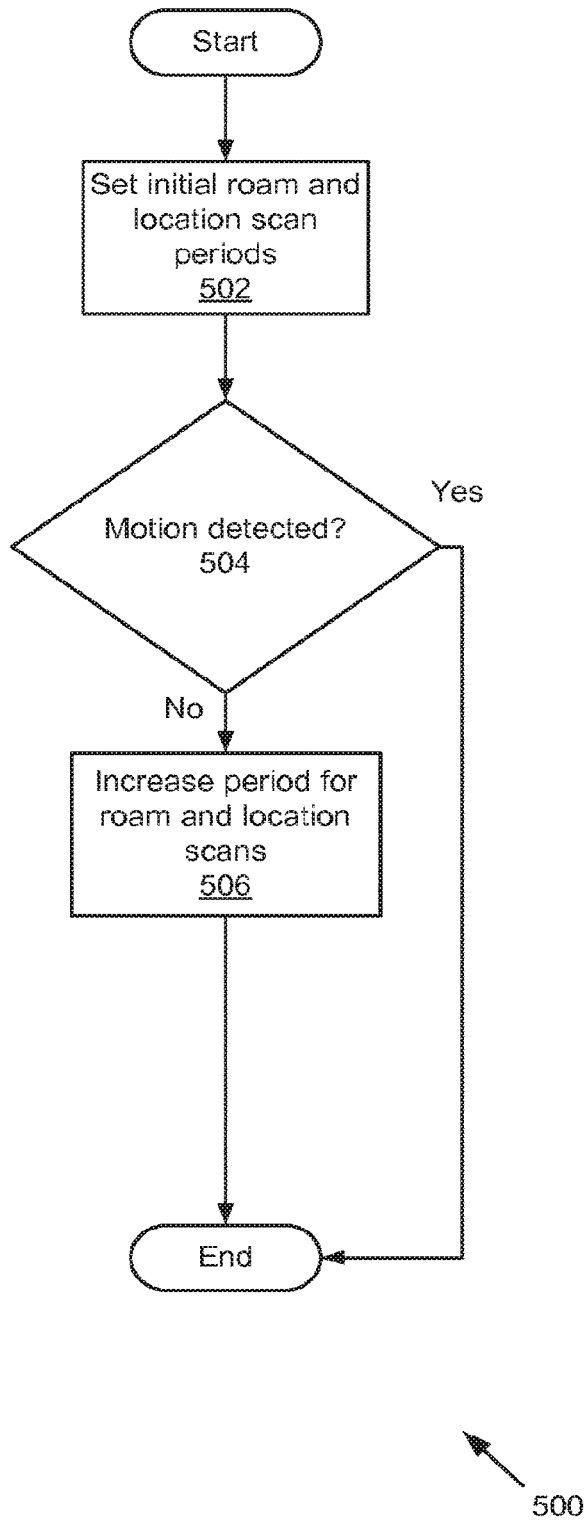

FIG. 5 is a flowchart of method steps for adapting network scanning rates, according to one embodiment of the specification.

Figure 6:
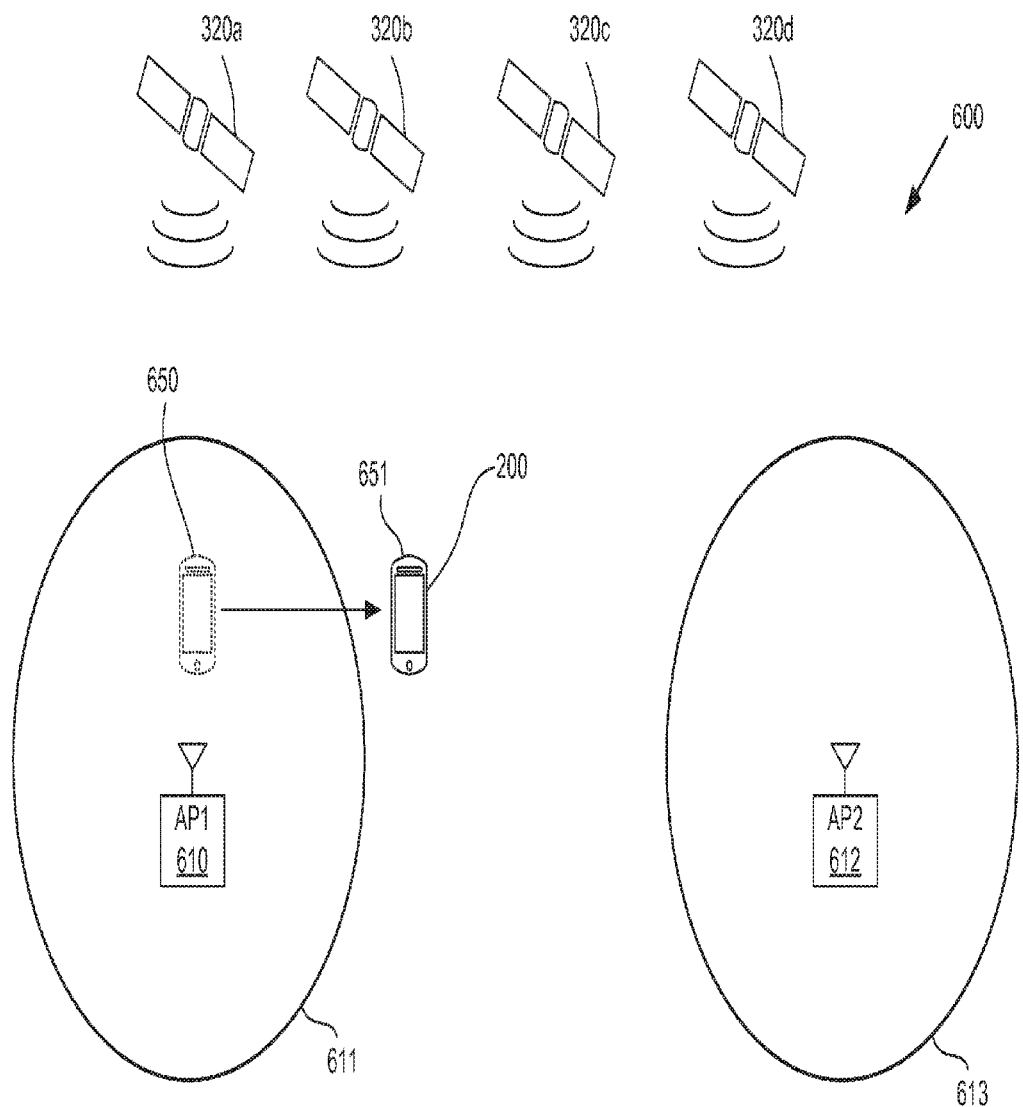

FIG. 6 is a diagram showing another embodiment of an adaptive scanning wireless system.

Figure 7:
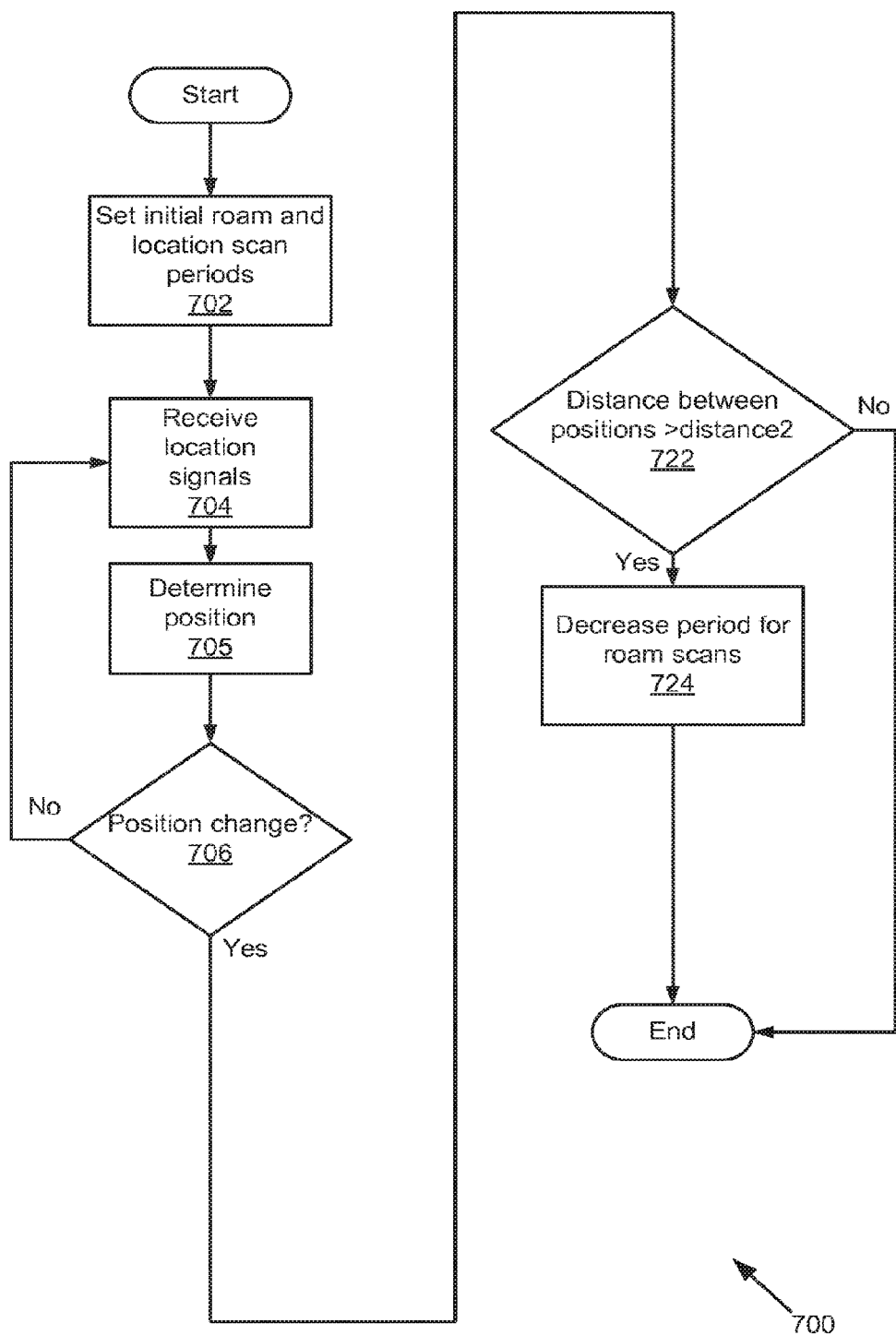

FIG. 7 is a flowchart of method, steps for adapting network scanning rates, according to one embodiment of the specification.

Figure 8:
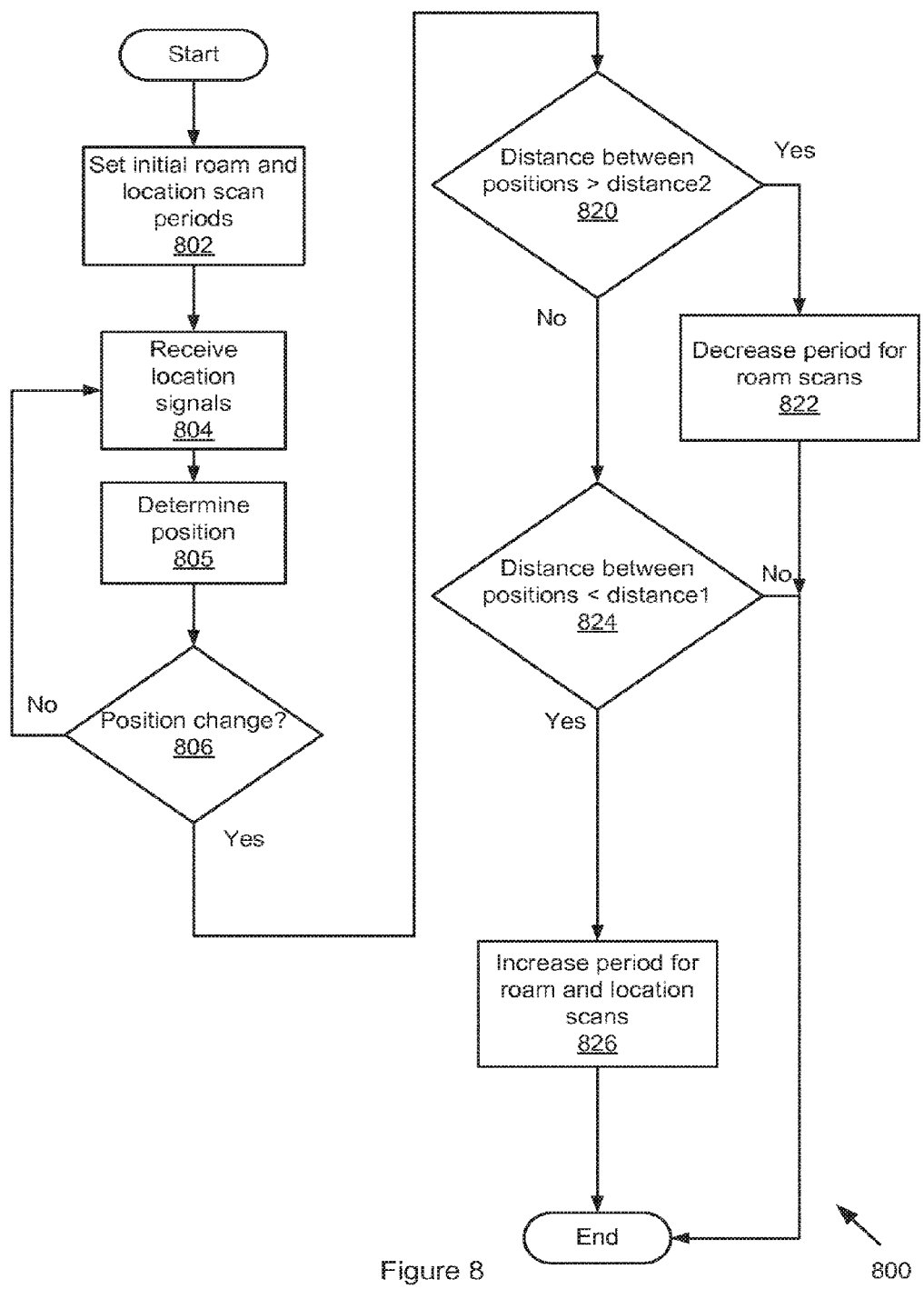

FIG. 8 is a flowchart of method steps for adapting network scanning rates, according to one embodiment of the specification.

Figure 9:
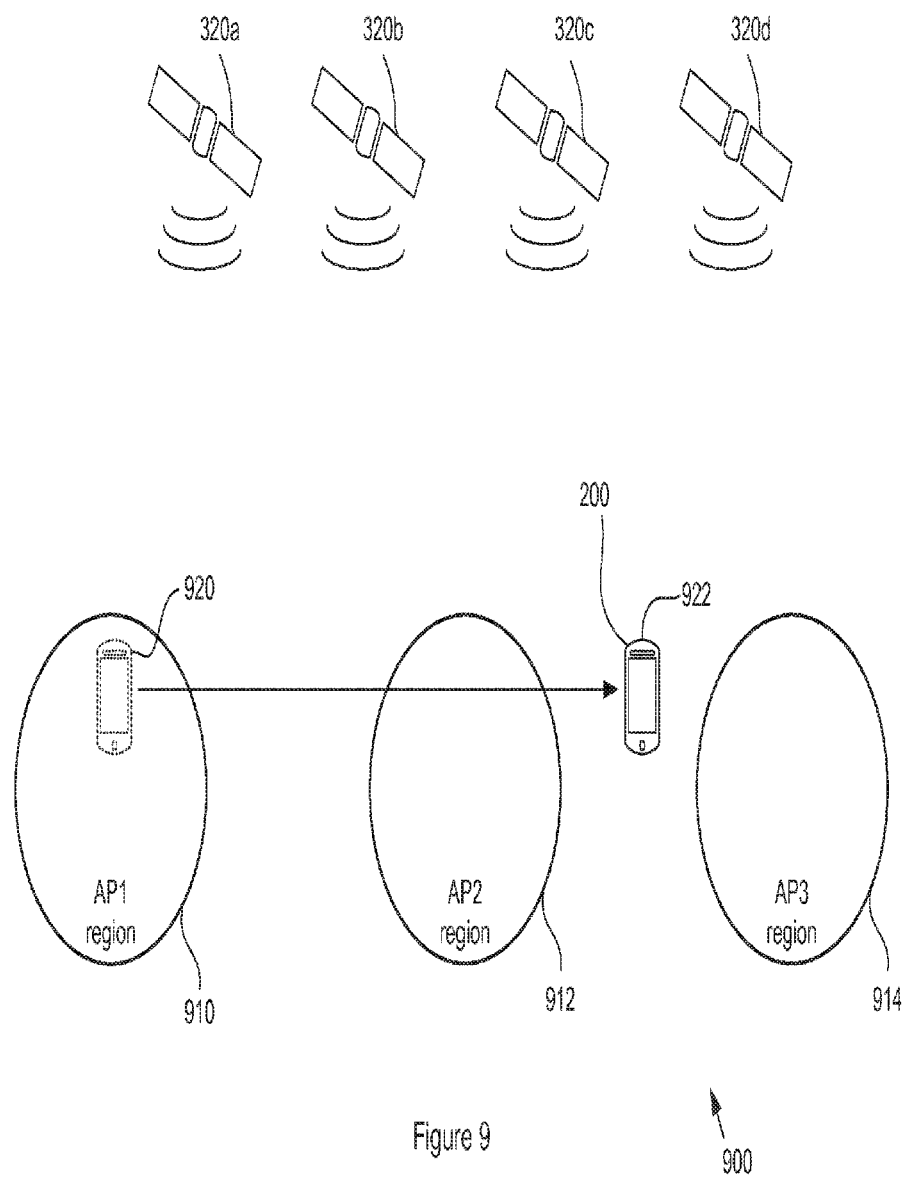

FIG. 9 is a diagram showing another embodiment of an adaptive scanning wireless system.

Figure 10:
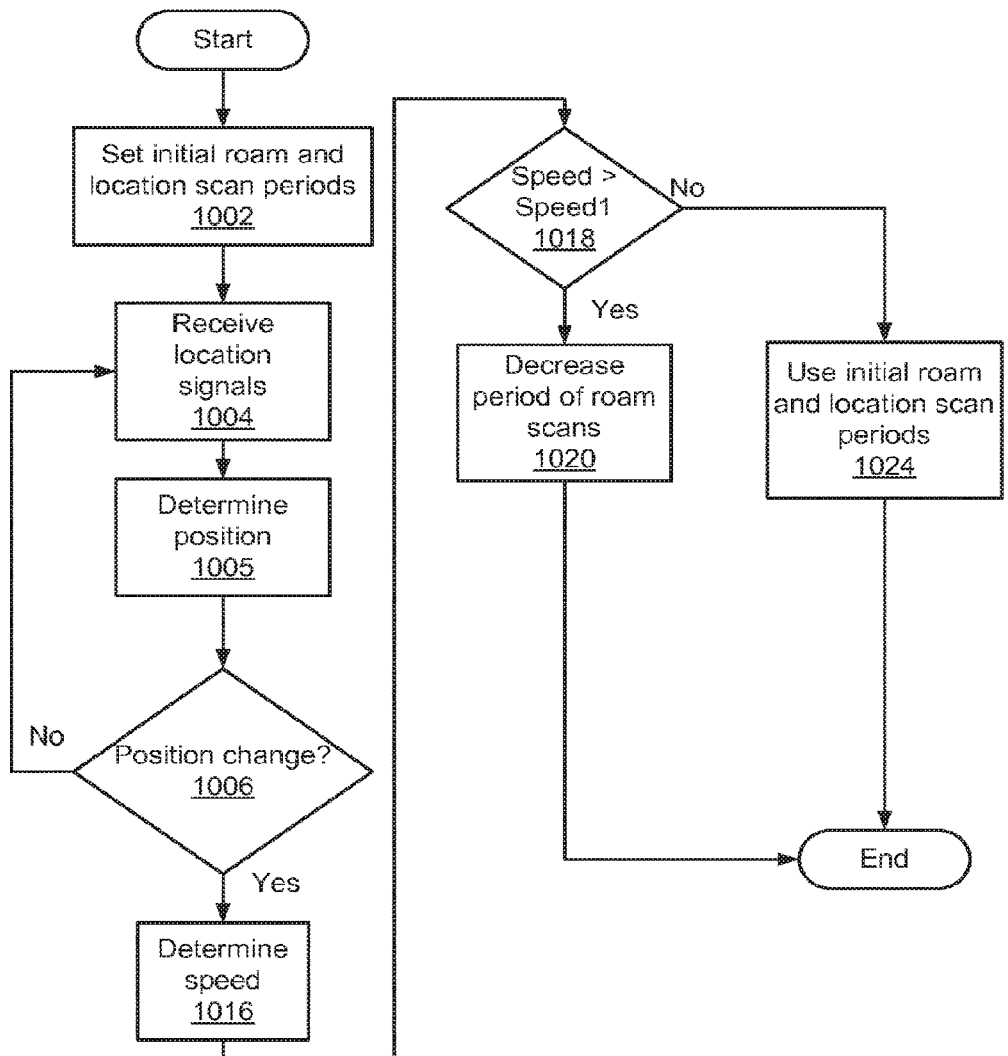

FIG. 10 is a flowchart of method steps for adapting network scanning rates, according to one embodiment of the specification.

Figure 11:
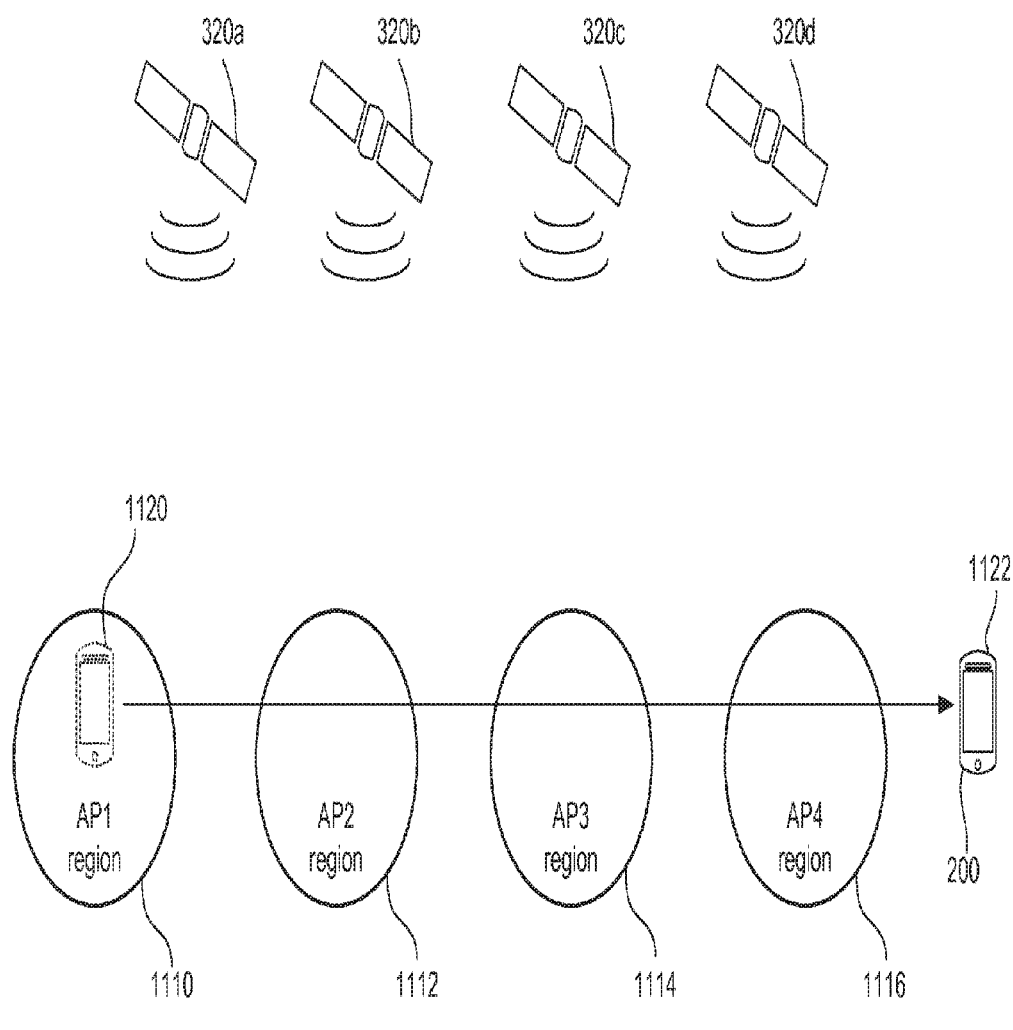

FIG. 11 is a diagram showing another embodiment of an adaptive scanning wireless system.

Figure 12:
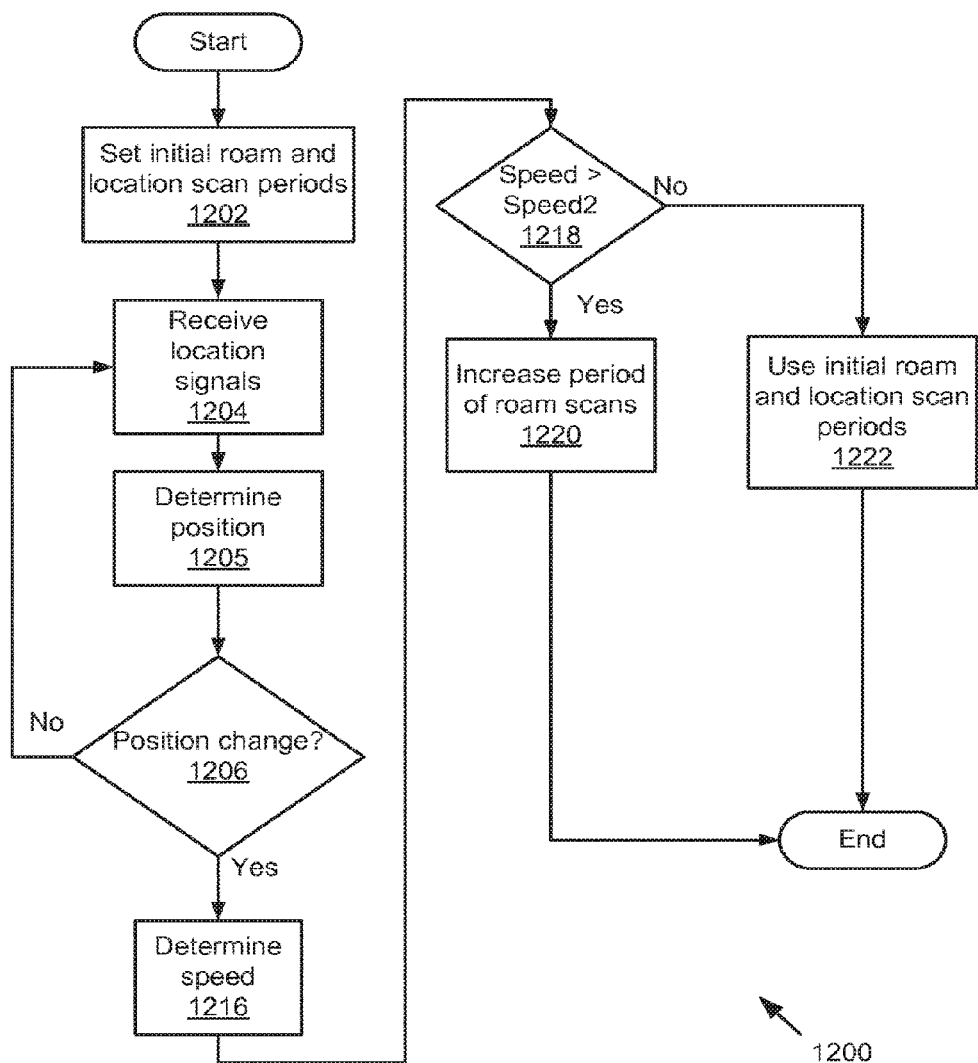

FIG. 12 is a flowchart of method steps for adapting network scanning rates, according to one embodiment of the specification.

Figure 13:
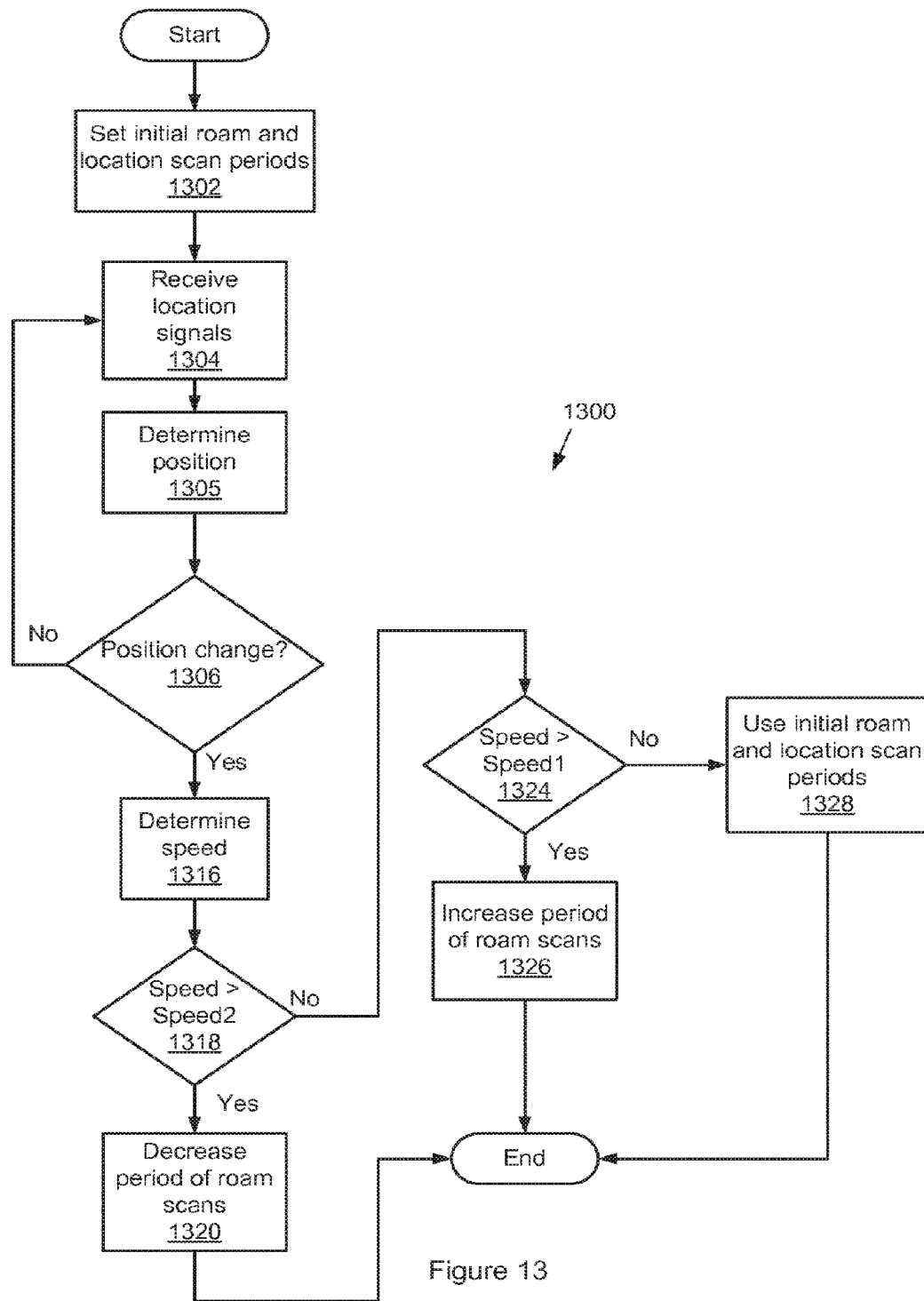

FIG. 13 is a flowchart of method steps for adapting network scanning rates, according to another embodiment of the specification.

Figure 14:
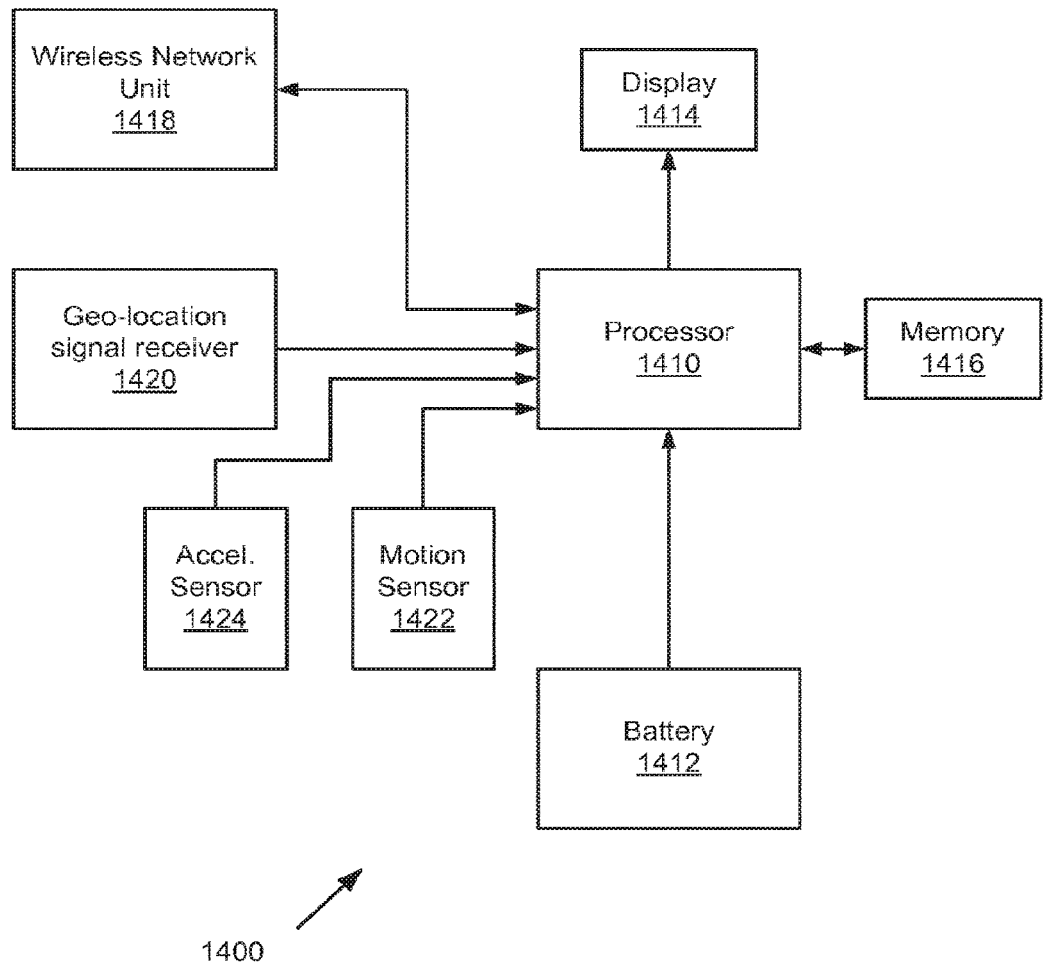

FIG. 14 is another block diagram of a wireless device, according to one embodiment of the specification.

DETAILED DESCRIPTION OF EXAMPLE EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Wireless devices can include a cell phone modem, a wireless network unit and a geo-location signal receiver. Geo-location signal receivers can often be referred to as Global Navigation Satellite System (GNSS) receiver and can receive and decode the geo-location signals from one or more geo-location systems. The cell phone modem can be used for voice and data. The wireless network unit can be used to connect to a wireless network and the geo-location signal receiver can be used to receive, recover and decode geo-location (i.e., GNSS satellite) signals and provide location data.

Wireless devices, especially when they are mobile wireless devices, can perform roam scans and location scans. Roam scans can be used to determine presence and operating characteristics of wireless networks, particularly those wireless networks that may not be currently used by the wireless device. These roam scans can be used to create a list of alternative wireless networks that can be used should signal metrics of a currently used wireless network degrade.

Location scans, in contrast, can be used to support location based services for the user. A location scan can be made to determine signal characteristics of access points (APs) within signal range of the wireless device. Often, using a location server, the signal characteristics can be used to locate the wireless device and provide location based services such as location based advertisements or messages.

Roam scans and location scans can occur with a regular period. One drawback of these periodic scans is that they can present an increased power drain on a battery of the wireless device. However, by adaptively changing the roam scan and location scan periods, the power drain can be reduced.

By advantageously using geo-location signal derived position data, the period between roam scans and/or location scans can be adapted to, in one embodiment, reduce power consumption. In another embodiment, the period between roam scans and/or location scans can be adapted to improve the user experience.

FIG. 1 is a diagram showing one example of a wireless system 100. The system 100 can include a wireless device 102, access points 104, 106 and 108, a network 110, a location server 112 and a cell tower 120. The wireless device 102 can include circuitry to enable a connection between the wireless device 102 and the cell tower 120 and between the wireless device 102 and the access points 104, 106 and 108. Examples of wireless devices 102 can include smartphones, personal digital assistants and laptops.

The wireless device 102 can connect to the cell tower 120 to transfer data to and from a cell phone network (not shown). The wireless device 102 can also connect to at least one of the APs within the wireless system 100. In the example of FIG. 1, the wireless device 102 is connected to AP 108. The coverage area of an AP is schematically represented by a circle drawn around the AP. In this example, AP 104 has coverage 105, AP 106 has coverage 107 and AP 108 has coverage 109.

The wireless device 102 can move beyond the coverage area 109 of the AP 108. The wireless device 102 can maintain a list of alternate APs that may be used if, for example, signal strength should fall below a predefined level. In order to maintain the list of alternate APs the wireless device 102 can perform periodic roam scans to determine the presence and signal characteristics of other APs that are relatively near the wireless device 102. In one embodiment, a roam scan can include probe request and probe response frames that can be sent on wireless channels in accordance with IEEE 802.11 standards.

The wireless device 102 can also perform location scans to enable location based services. In one embodiment, location scans can determine the presence, and to some extent the proximity of nearby APs. Similar to a roam scan, in one embodiment, a location scan can include probe request and probe response frames that can be sent on wireless channels in accordance with IEEE 802.11 standards. The results of the probe responses, including signal characteristics such as signal strength can be sent to the location server 112. The location server 112 can examine the results of the locations scan and determine the presence of any services for the user such as location based advertisements or messages. In one embodiment, the location server 112 can provide this data through the network 110 and the AP 108 to the wireless device 102.

Both the roam scans and the location scans can occur periodically. The periods of the roam and location scans need not match. Also, some scans can be context sensitive. For example, location scans can be suspended altogether depending on other activities from the user on the wireless device 102. For example, a user can choose to block location based advertisements eliminating the need for location scans.

FIG. 2 is a block diagram of one embodiment of a wireless device 200 in accordance with the specification. The wireless device 200 can include a wireless network engine 202, a geo-location signal receiver 204, a motion sensor 220, and a processor 206. The wireless network engine 202 can be coupled to the processor 206 and can be configured to transmit and receive wireless data according to a wireless protocol. In one embodiment, the wireless network engine 202 can be configured to transfer data to and from APs according to an IEEE 802.11 standard through antenna 210.

The geo-location signal receiver 204 can receive geo-location signals, such as satellite positioning signals through antenna 212. In one embodiment, the geo-location signal receiver 204 can be co-located with the wireless network engine 202. In another embodiment, the geo-location signal receiver 204 may be realized separately, but co-located with the wireless device 200. The geo-location signals can be geo-location signals such as Global Positioning System (GPS) signals broadcast from the U.S. based navigation satellite system, GLObal NAvigational Satellite System a (GLONASS) signals broadcast from the Russian based navigation satellite system or other similar systems. The geo-location signal receiver 204 can be coupled to the processor 206 and provide location data derived from the received satellite signals.

In one embodiment, the processor 206 can include a location engine 208. The location engine 208 can examine the location data from the geo-location signal receiver 204 and determine movement dynamics (speed and direction) of the wireless device 200. The location data from the geo-location signal receiver 204 can include position information of the wireless device 200. In one embodiment, the location data can include latitude and longitude information. In another embodiment, the location data can include a relative position of the wireless device 200. The location engine 208 can also monitor the geo-location signal receiver 204 and determine whether navigation satellites have been acquired and whether the geo-location signal receiver 204 can continue to track navigation satellites. If the geo-location signal receiver 204 can track the navigation satellites, then the geo-location signal receiver 204 is said to have be in a locked condition. Additionally, the motion sensor 220 can be coupled to the processor 206 and can provide motion information related to the wireless device 200 to the processor 206.

FIG. 3 is a diagram showing one embodiment of an adaptive scanning wireless system 300. The system 300 can include a wireless device 200, access points 310 and 312 and geo-location satellites 320a, 320b, 320c, and 320c. The wireless device 200 can be similar to the wireless device 200 of FIG. 2 and include both a wireless network engine and a geo-location signal receiver. AP 310 can have a coverage area shown by circle 311 and AP 312 can, have a coverage area shown by circle 314.

The wireless device 200 can receive geo-location satellite signals from the geo-location satellites 320a-320d, and the geo-location signal, receiver 204 included within the wireless device 301 can determine the position of the wireless device 200. Although four geo-location satellites are shown here, persons skilled in the art can appreciate that the position of wireless device 200 can be determined with fewer than or more than four geo-location satellites. Using the determined position, the wireless device 200 can determine if the wireless device 200 has been or is moving, and moreover, if the wireless device 200 has moved less than a predetermined distance. If the wireless device 200 has moved less than a predetermined distance, then the wireless device 200 can be assumed to be stationary or moving a such a slow rate that the wireless device 200 is substantially stationary. For example, wireless device can begin in position 301 (shown with dashed lines in FIG. 3) and move to position 303. In the example, the wireless device 200 has little or no motion detected and remains within coverage area 311.

When the wireless device 200 is stationary or substantially stationary, the period of the roam scans can be increased (roam scans can be performed less frequently). As described above, roam scans can be used to determine the presence and availability of alternate wireless networks that can be used as the wireless device 200 moves out of a service area of a currently used wireless network. Since the wireless device 200 is effectively still, or moving very slowly, roam scans can be unnecessary, given that switching to an alternate wireless network is relatively unlikely.

In a similar manner, when the wireless device 200 is stationary or substantially stationary, the period of the location scans can advantageously be increased (location scans can be performed less frequently). Provided that an earlier location scan has completed, more recent location scans will not provide any new or useful information.

The wireless device 200 can also determine motion through, the motion sensor 220 within the wireless device 200. If the wireless device 200 determines that no or substantially no motion has occurred, then the roam and location scans can be adapted as described earlier (roam and location scans can be performed less frequently).

FIG. 4 is a flowchart 400 of method steps for adapting network scanning rates, according to one embodiment of the specification. Persons skilled in the art will understand that any system configured to perform the method steps in any order is within the scope of this description.

As shown in FIG. 4, the method begins in step 402 where the scanning periods for roam scans and location scans are set to an initial period. In one embodiment the initial scan periods can be 45 seconds. In another embodiment, the scan period can be a telescopic period. For example, the initial period may start out at 1 second, then may increase to a maximum. One telescopic sequence can be 1, 3, 5, 10 and 30 seconds. The initial scan periods can be any period, in particular the selected period times can provide an acceptable rate of determining the presence of new networks and reacting to them. In another embodiment, the initial scan periods can be inherited as the method begins. That is, the scan period that was previously determined or used when the method began, can be used as the initial scan period.

In step 404, the wireless device 200 can receive geo-location signals. In one embodiment the geo-location signals can be geo-location satellite signals. In step 405, the geo-location signal receiver 204 can determine a position of the wireless device 200 from the received geo-location signals. In step 406, the wireless device 200 determines if the position of the wireless device 200 has changed. If the position of the wireless device 200 has not changed then the method returns to step 404. The sequence of steps 404, 405 and 406 can be referred to as tracking, geo-location signals. Tracking, can be a continual or periodic reception and processing of geo-location signals to update a determined position. Returning to step 406, if the position of the wireless device 200 has changed, then the method proceeds to step 422.

In step 422, the wireless device 200 determines if the wireless device 200 has moved (been displaced) less than a first predetermined distance. In one embodiment, the first predetermined distance can be a user adjustable amount. In another embodiment, the first predetermined distance can be 1 meter. If the wireless device 200 has moved less than the first predetermined distance, then in step 424 the period for roam scans and location scans can be increased (roam and location scans can be performed less frequently then as set forth in step 402) and the method ends. In one embodiment, the method of FIG. 4 can be modified such than instead of terminating, the method can, instead, loop back, to step 402. The addition of such a loop can advantageously allow for continuous rate adaptation.

Since the determined movement of the wireless device 200 is less than a movement threshold determined by the first predetermined distance, the wireless device 200 has not likely moved beyond the coverage range of a currently connected AP. In this case, the period of the roam and location scans can be increased. Increasing the roam and location scan periods can advantageously reduce power consumption of the wireless device 200.

Many wireless devices include a motion sensor that may be advantageously be used to adapt wireless network scans. FIG. 5 is a flowchart 500 of method steps for adapting network scanning rates, according to one embodiment of the specification. The method being in step 502 where the scanning periods for roam scans and location scans are set to an initial period. In step 504, motion is monitored by the, motion sensor 220. If motion is detected, then the method ends. If on the other hand, no motion is detected, then in step 506 the period is increased for roam and location scans (roam and location scans are performed less frequently then as set forth in step 502) and the method ends. In one embodiment, the method of FIG. 5 can be modified such than instead of terminating, the method can, instead, loop back to step 502. The addition of such a loop can advantageously allow for continuous rate adaptation. Although the method 500 describes a motion sensor, other sensors can be used. For example, an accelerometer or shock sensor may be used in lieu of or with the motion sensor 220.

FIG. 6 is a diagram showing another embodiment of an adaptive scanning wireless system 600. The system 600 can include a wireless device 200, access points 610 and 612 and geo-location satellites 320a, 320b, 320c, and 320c.

As shown in FIG. 6, AP 610 can have a coverage area 611 as shown. AP 612 can be a second AP with a coverage area 613. As shown, the coverage areas 611 and 613 do not overlap. Wireless device 200 can be moved from a first position to a second position. The first position is shown as 650 (the wireless device is 200 shown with dashed lines) and, the second position is shown as 651 (the wireless device 200 is shown with solid lines). A shown, the amount of displacement can be greater than the coverage area of an AP, such as coverage area 611. When the wireless device 200 is displaced a distance greater than the coverage area of an AP, the wireless device 200 can advantageously reduce the period of roam scans to enable a faster discovery of other APs that can connect to the wireless device 200. Reducing roam scan periods (performing more frequent roam scans) can allow an adaptation of the scan rate, particularly if the scan rate was previously reduced as was described above in FIG. 4 or 5 enhancing responsiveness of wireless device 200.

FIG. 7 is a flowchart 700 of method steps for adapting network scanning rates, according to one embodiment of the specification. The method begins in step 702 where the scanning periods for roam scans and location scans are set to an initial period. In one embodiment the initial scan periods can be 45 seconds. In another embodiment the scan period can be a telescopic period as described above in FIG. 4. In yet another embodiment, the initial scan period can be inherited as the method begins. That is, the scan period that was previously determined when the method began, can be used as the initial scan period. That is, the scan period that was previously determined or used when the method began, can be used as the initial scan period.

In step 704, the wireless device 200 can receive geo-location signals. In one embodiment the geo-location signals can be geo-location satellite signals. In step 705, the geo-location signal receiver 204 can determine a position of the wireless device 200 from the received geo-location signals. In step 706, the wireless device 200 determines if the position of the wireless device 200 has changed. If the position of the wireless device 200 has not changed then the method returns to step 704. The sequence of steps 704, 705 and 706 can be referred to as tracking geo-location signals. Tracking can be a continual or periodic reception and processing of geo-location signals to update a determined position. Returning to step 706, if the position of the wireless device 200 has changed, then the method proceeds to step 722.

In step 722, the wireless device 200 determines if the wireless device 200 has moved (been displaced) more than a second predetermined distance. In one embodiment, the second predetermined distance can be related to the coverage area of an AP. In another embodiment, the second predetermined distance can be user selectable. A user selectable distance can be useful as an adjustment to compensate for an operating environment. For example, some environments can be relatively open and free from wireless signal blockers. Such environments can have larger AP coverage areas. On the other hand, if some environments have relatively more signal blockers or lower power APs, then the user selectable distance can be decreased.

If in step 722 the wireless device 200 has moved, more than a second predetermined distance, then in step 724 the period of the roam scans is decreased (roam scans can be performed more frequently then as set forth in step 702). If, on the other hand, the wireless device 200 has not moved more than a second predetermined distance, then the method ends. In one embodiment, the method of FIG. 7 can be modified such than instead of terminating, the method can, instead, loop back to step 702. The addition of such a loop can advantageously allow for continuous rate adaptation.

FIG. 8 is a flowchart 800 of method steps for adapting network scanning rates, according to one embodiment of the specification. This method can advantageously combine the methods set forth by FIGS. 4 and 7. The method begins in step 802 where the scanning periods for roam scans and location scans are set to an initial period. In one embodiment the initial scan periods can be 45 seconds. In another embodiment the scan, period can be a telescopic period as described above in FIG. 4.

In step 804, the wireless device 200 can receive geo-location signals. In one embodiment the geo-location signals can be geo-location satellite signals. In step 805, the geo-location signal receiver 204 can determine a position of the wireless device 200 from the received geo-location signals. In step 806, the wireless device 200 determines if the position of the wireless device 200 has changed. If the position of the wireless device 200 has not changed then the method returns to step 804. The sequence of steps 804, 805 and 806 can be referred to as tracking geo-location signals. Tracking can be a continual or periodic reception and processing of geo-location signals to update a determined position. Returning to step 806, if the position of the wireless device 200 has changed, then the method proceeds to step 820.

In step 820, the wireless device 200 determines if the wireless device 200 has moved more than a first predetermined distance. In one embodiment, the first predetermined distance is similar to the predetermined distance as described in FIG. 7. If the distance between the first and second position is greater than the first predetermined distance, then in step 822 the period between roam scans can be decreased (roam scans can be performed more frequently then as set forth in step 802) and the method ends.

If, on the other hand, the wireless device 200 has moved less than the first predetermined distance, then in step 824 the wireless device 200 determines if the wireless device 200 has moved less that a second predetermined distance. In one embodiment, the second predetermined distance can be similar to the predetermined distance described in FIG. 4. If the wireless device 200 has moved less than the second predetermined distance, then in step 826 the period between both roam and location scans can be increased (roam and location scans can be performed less frequently then as set forth in step 806) and the method ends. If, in step 824, the distance between the first and second positions is not less than the second predetermined distance, then the method ends. In one embodiment, the method of FIG. 8 can be modified such than instead of terminating, the method can, instead, loop back to step 802. The addition of such a loop can advantageously allow for continuous rate adaptation.

FIG. 9 is a diagram showing another embodiment of an adaptive scanning wireless system 900. The system 900 can include a wireless device 200, access point regions 910, 912 and 914 and geo-location signal 320a-320d. Access point coverage regions 910, 912 and 914 illustrate a coverage area that can be serviced by an associated access point (APs are not shown for clarity).

Wireless device 200 is shown in a first position 920 and moves to a second position 922. To help illustrate this motion, the wireless device 200 is drawn with dashed lines at the first position 920 and solid lines at the second position 922.

As described above, the periodicity of roam scans can be adapted to help enhance the user experience in the wireless device 200. The exemplary scenario illustrated in FIG. 9 shows the wireless device 200 in motion. In this case, the wireless device 200 can move at a rate that is greater than a walking speed. In one embodiment, this speed is 8 miles per hour. In another embodiment, the speed can a user set parameter. Since the wireless device 200 moves faster than a walking speed, the wireless device 200 does not linger in an AP coverage area for an extended period of time. The wireless device 200 can be more responsive by becoming aware of the presence of other APs while the wireless device 200 is in motion. Thus, the user experience can be improved by performing roam scans more often.

FIG. 10 is a flowchart 1000 of method steps for adapting network scanning rates, according to one embodiment of the specification. The method begins in step 1002 where the scanning periods for roam scans and location scans are set to an initial period. In one embodiment the initial scan periods can be 45 seconds. In another embodiment the scan period can be a telescopic period as described above in FIG. 4.

In, step 1004, the wireless device 200 can receive geo-location signals. In one embodiment the geo-location signals can be geo-location satellite signals. In step 1005, the geo-location signal receiver 204 can determine a position of the wireless device 200 from the received geo-location signals. In step 1006, the wireless device 200 determines if the position of the wireless device 200 has clanged. If the position of the wireless device 200 has not changed then the method returns to step 1004, The sequence of steps 1004, 1005 and 1006 can be referred to as tracking geo-location signals. Tracking can be a continual or periodic reception and processing of geo-location signals to update a determined position. Returning to step 1006, if the position of the wireless device 200 has changed, then the method proceeds to step 1016.

In step 1016, the speed of the wireless device 200 is determined with location data from the geo-location signal receiver 204.

in step 1018, a speed of the wireless device 200 is compared to a predetermined speed. In one embodiment, this predetermined speed is faster than a walking speed. In another embodiment, the predetermined speed is 8 miles per hour. In yet another embodiment, the predetermined speed can be set by the user. If the speed of the wireless device 200 is greater than the predetermined speed, then in step 1020 the period of the roam scans is decreased (i.e., roam scans are performed more frequently than as set forth in step 1002) and the method ends.

If, on the other hand, in step 1018 the speed of the wireless device 200 is not greater than the predetermined speed, then the method proceeds to step 1024 and the periods of the roam and location scans are not changed and the method ends. In one embodiment, the method of FIG. 10 can be modified such than instead of terminating, the method can, instead, loop back to step 1010. The addition of such a loop can advantageously allow for continuous rate adaptation.

FIG. 11 is a diagram showing another embodiment of an adaptive scanning wireless system 1100. The system 1100 can include a wireless device 200, access point coverage regions 1110, 1112, 1114 and 1116 and geo-location satellites 320a-320d. Access point coverage regions 1110, 1112, 1114 and 1116 illustrate a coverage area that can be serviced by an associated access point (APs are not shown for clarity).

Wireless device 200 is shown in a first position 1120 and moving to a second position 1122. To help illustrate this motion, the wireless device 200 is drawn with dashed lines at the first position 1120 and solid lines at the second position 1122.

Similar to FIG. 9, FIG. 11 illustrates a scenario when the wireless device 200 is moving, but in this exemplary example, the speed of the wireless device 200 is much greater than walking speed. In one embodiment, the speed of the wireless device 200 can be similar to the speed of a train or plane in motion. In another embodiment, the speed of the wireless device 200 can be greater than or equal to 50 miles per hour. When the wireless device 200 travels at such a speed, the wireless device 200 typically cannot completely receive wireless signals from nearby APs without error. At such rates of speed, the wireless device 200 travels quickly through AP regions (illustrated by the arrow in FIG. 11). Since the probability is low that the wireless device 200 can correctly receive and decode wireless signals from the APs, the period of roam scans can advantageously be increased to reduce power consumption (roam and location scans can be performed less frequently).

FIG. 12 is a flowchart 1200 of, method steps for adapting network scanning rates, according to one embodiment of the specification. The method begins in step 1202 where the scanning periods for roam scans and location scans are set to an initial period. In one embodiment the initial scan periods, can be 45 seconds. In, another embodiment the scan period can be a telescopic period as described above in FIG. 4.

In step 1204, the wireless device 200 can receive geo-location signals. In one embodiment the geo-location signals can be geo-location satellite signals. In step 1205, the geo-location signal receiver 204 can determine a position of the wireless device 200 from the received geo-location signals. In step 1206, the wireless device 200 determines if the position of the wireless device 200 has changed. If the position of the wireless device 200 has not changed then the method returns to step 1204. The sequence of steps 1204, 1205 and 1206 can be referred to as tracking geo-location signals. Tracking can be a continual or periodic reception and processing of geo-location signals to update a determined position. Returning to step 1206, if the position of the wireless device 200 has changed, then the method proceeds to step 1216.

In step 1216, a speed is determined of the wireless device 200 using location data from the, geo-location signal receiver 204.

In step 1218, the speed of the wireless device 200 is compared to a predetermined speed. In one embodiment, this predetermined speed is similar to a typical speed of travel for a train. In another embodiment, the predetermined speed can be 50 miles per hour. In yet another embodiment, the predetermined speed can be set by the user. If the speed of the wireless device 200 is greater than the predetermined speed, then in step 1220 the period of the roam scans is increased (roam scans are performed less frequently than as set forth in step 1202) and the method ends. If the speed of the wireless device 200 is less than the predetermined speed, then in step 1222 the periods of the roam and location scans are not changed and the method ends.

The methods described in the flowcharts of FIG. 10 and FIG. 12 can be combined to ease implementation. Since each individual method targets a distinct speed threshold, two different predetermined speeds can be used to implement the combined method. In one embodiment, the method of FIG. 12 can be modified such than instead of terminating, the method can, instead, loop back to step 1210. The addition of such a loop can advantageously allow for continuous rate adaptation.

FIG. 13 is a flowchart 1300 of method steps for adapting network scanning rates, according to another embodiment of the specification. The method begins in step 1302 where the scanning periods for roam scans and location scans are set to an initial period. In one embodiment the initial scan periods can be 45 seconds. In another embodiment the scan period can be a telescopic period as described above in FIG. 4.

In step 1304, the wireless device 200 can receive geo-location signals. In one embodiment the geo-location signals can be geo-location satellite signals. In step 1305, the geo-location signal receiver 204 can determine a position of the wireless device 200 from the received geo-location signals. In step 1306, the wireless device 200 determines if the position of the wireless device 200 has changed. If the position of the wireless device 200 has not changed then the method returns to step 1304. The sequence of steps 1304, 1305 and 1306 can be referred to as tracking geo-location signals. Tracking can be a continual or periodic reception and processing of geo-location signals to update a determined position. Returning to step 1306, if the position of the wireless device 200 has changed, then the method proceeds to step 1316.

In step 1316, the speed is determined of the wireless device 200 using location data from the geo-location signal receiver 204. In step 1318, the speed of the wireless device 200 is compared to a first predetermined speed. In one embodiment, the first predetermined speed is similar to the predetermined speed described in step 1218 in flowchart 1200. In another embodiment, the first predetermined speed is 55 miles per hour. If the speed of the wireless device 200 is greater than the first predetermined speed, then in step 1320, the period of the roam scans are decreased (scans cat be performed more frequently than as set forth in step 1302) and the method ends.

On the other hand, if the speed of the wireless device 200 is not greater than the first predetermined speed, in step 1324, the speed of the wireless device 200 is compared to a second predetermined speed. In one embodiment, the second predetermined speed, can be similar to the speed described in step 1018 in flowchart 1000. In another embodiment, the second predetermined speed is 8 miles an hour. In yet another embodiment, the second predetermined speed is less than the first predetermined speed. If the speed of the wireless device 200 is greater than the second predetermined speed, then in step 1326 the period between roam scans is increased (the roam scans are performed less frequently) and the method ends. On the other hand, if in step 1324, the speed of the wireless device 200 is not greater than the second predetermined speed, then in step 1328 the scan periods of the roam and location scans remain unchanged and the method ends. In one embodiment, the method of FIG. 13 can be modified such than instead of terminating, the method can, instead, loop back to step 1310. The addition of such a loop can advantageously allow for continuous rate adaptation.

FIG. 14 is another block diagram of a wireless device 1400, according to one embodiment of the specification. The wireless device 1400 can include, without limitation, a processor 1410, a battery 1412, a display unit 1414, a memory 1416, a wireless network unit 1418, a geo-location signal receiver 1420, a motion sensor 1422 and an acceleration sensor 1424.

The processor 1410 can be used to execute computer code stored in the memory device 1416. The memory device 1416 can be random access memory (RAM), read only memory (ROM), a disc drive (HDD), a CD-ROM, a DVD or any other technically feasible data storage device. The battery 1412 cab be coupled to the processor 1410 and can provide power to the processor 1410 and other units within the wireless device 1400. The display unit 1414 can be coupled to the processor 1410. The processor 1410 can display user information and data on the display unit 1414.

The wireless network unit 1418 can be coupled to the processor 1410. The wireless network unit 1418 can transfer wireless network data with other wireless nodes such as wireless APs. In one embodiment, data received by the wireless unit 1418 can be processed by the processor 1410 and displayed on the display unit 1414. The geo-location signal receiver 1420 can be coupled to the processor 1410 and can receive geo-location signals (such as GNSS satellite signals) and process the received signals. In one embodiment, the geo-location signal receiver 1420 can provide location data. The motion sensor 1422 and the acceleration sensor 1424 can be coupled to the processor 1410 and can provide motion and acceleration data.

The processor 1410 can configure the wireless network unit 1418 to increase or decrease the period of wireless network scans relative to an initial period setting of wireless network scans. The processor 1410 can increase and decrease the period of wireless network scans based upon location and tracking data from the geo-location signal receiver 1420, motion data from the motion sensor 1422 and/or acceleration data from the acceleration sensor 1424.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the, computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in, a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method, comprising:
by a wireless device, performing operations for:
receiving location signals that indicate positions of the wireless device;
determining a speed of the wireless device based at least in part on the location signals; and
altering a period of time between wireless network scans made by the wireless device based at least in part on the speed of the wireless device, wherein the period of time between wireless network scans is increased in response to the speed being greater than a first speed.

2. The method of claim 1, wherein the period of time between wireless network scans is increased in response to the speed being less than a second speed.

3. The method of claim 1, wherein the period of time between wireless network scans is decreased in response to the speed being greater than a second speed and less than the first speed.

4. The method of claim 1, wherein receiving the location signals comprises receiving the location signals in a geo-location signal receiver in the wireless device.

5. The method of claim 1, wherein the wireless network scans comprise location scans.

6. The method of claim 1, wherein the wireless network scans comprise roam scans.

7. The method of claim 1, wherein the wireless network scans comprise scans based at least in part on an IEEE 802.11 specification.

8. A wireless device, comprising:
a network unit configured to perform operations for wireless network scans;
a geo-location signal receiver configured to perform operations for receiving location signals that indicate positions of the wireless device; and
a processor configured to:
determine a speed of the wireless device based at least in part on the location signals; and
alter a period of time between wireless network scans performed by the network unit based at least in part on a change of speed of the wireless device, wherein the period of time between wireless network scans is increased in response to the speed being greater than a first speed.

9. The wireless device of claim 8, wherein the period of time between wireless network scans is increased in response to the speed being less than a second speed.

10. The wireless device of claim 9, wherein the wireless network scans comprise scans based at least in part on an IEEE 802.11 wireless specification.

11. The wireless device of claim 8, wherein the period of time between wireless network scans is increased in response to the speed being less than a second speed, and wherein the period of time between wireless network scans is decreased in response to the speed being greater than the second speed and less than the first speed.

12. The wireless device of claim 8, wherein the wireless network scans comprise location scans.

13. The wireless device of claim 8, wherein the wireless network scans comprise roam scans.

14. A non-transitory computer-readable storage medium storing instructions which, when executed by a wireless device, cause the wireless device to perform a method comprising:
receiving location signals that indicate positions of the wireless device;
determining a speed of the wireless device based at least in part on the location signals; and
altering a period of time between wireless network scans made by the wireless device based at least in part on the speed of the wireless device, wherein the period of time between wireless network scans is increased in response to the speed being greater than a first speed.

15. The computer-readable storage medium of claim 14, wherein the period of time between wireless network scans is increased in response to the speed being less than a second speed.

16. The computer-readable storage medium of claim 14, wherein the period of time between wireless network scans is increased in response to the speed being less than a second speed, and wherein the period of time between wireless network scans is telescopically increased.

17. The computer-readable storage medium of claim 14, wherein the period of time between wireless network scans is increased in response to the speed being less than a second speed, and wherein the period of time between wireless network scans is decreased in response to the speed being greater than the second speed and less than the first speed.

18. The computer-readable storage medium of claim 14, wherein the wireless network scans comprise location scans.

19. The computer-readable storage medium of claim 14, wherein the wireless network scans comprise roam scans.

20. The computer-readable storage medium of claim 14, wherein the wireless network scans comprise scans based at least in part on an IEEE 802.11 wireless specification.

* * * * *